(12) United States Patent
Goriki et al.

(10) Patent No.: US 8,115,404 B2
(45) Date of Patent: Feb. 14, 2012

(54) HIGH PRESSURE DISCHARGE LAMP LIGHTING DEVICE AND LUMINAIRE

(75) Inventors: Takeshi Goriki, Yawata (JP); Takeshi Kamoi, Kyoto (JP); Nobutoshi Matsuzaki, Neyagawa (JP); Daisuke Yamahara, Shijonawate (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 186 days.

(21) Appl. No.: 12/461,405

(22) Filed: Aug. 11, 2009

(65) Prior Publication Data

US 2010/0039039 A1    Feb. 18, 2010

(30) Foreign Application Priority Data

Aug. 15, 2008   (JP) .................. 2008-209318

(51) Int. Cl.
*H05B 41/16* (2006.01)
*G05F 1/00* (2006.01)
(52) U.S. Cl. ...................... 315/246; 315/308
(58) Field of Classification Search .............. 315/246, 315/291, 307, 308
See application file for complete search history.

(56) References Cited

U.S. PATENT DOCUMENTS

| | | | | |
|---|---|---|---|---|
| 5,486,740 A | * | 1/1996 | Yamashita et al. | 315/308 |
| 5,629,588 A | * | 5/1997 | Oda et al. | 315/308 |
| 5,939,835 A | * | 8/1999 | Takeda et al. | 315/209 R |
| 6,791,273 B2 | * | 9/2004 | Ito et al. | 315/82 |
| 6,794,832 B2 | * | 9/2004 | Yamamoto et al. | 315/307 |
| 2002/0047634 A1 | * | 4/2002 | Ito et al. | 315/291 |
| 2002/0047641 A1 | * | 4/2002 | Ito et al. | 315/307 |
| 2002/0109467 A1 | * | 8/2002 | Ito et al. | 315/291 |
| 2003/0030380 A1 | * | 2/2003 | Oda | 315/77 |
| 2003/0057869 A1 | * | 3/2003 | Ito et al. | 315/224 |
| 2003/0201735 A1 | * | 10/2003 | Yamamoto et al. | 315/291 |
| 2005/0062435 A1 | * | 3/2005 | Namba et al. | 315/224 |
| 2006/0012318 A1 | * | 1/2006 | Ichikawa et al. | 315/308 |
| 2007/0164689 A1 | * | 7/2007 | Suzuki | 315/291 |

\* cited by examiner

*Primary Examiner* — Shawki S Ismail
*Assistant Examiner* — Thienvu Tran
(74) *Attorney, Agent, or Firm* — Bacon & Thomas, PLLC

(57) ABSTRACT

A high pressure discharge lamp lighting device, includes: a DC/DC converter for converting a power source voltage of a DC power source into a desired DC voltage and stably lighting a high pressure discharge lamp; a DC/AC inverter for inverting the DC voltage into an AC voltage; and a starting pulse generating circuit for generating a high voltage required for the start-up of the high pressure discharge lamp. Further, the high pressure discharge lamp lighting device includes a lighting state decision unit for deciding a lighted/unlighted state of the high pressure discharge lamp; and an operating state switching control unit for switching the operating state of at least one of the DC/DC converter, the DC/AC inverter, and the starting pulse generating circuit to another operating state, depending on a predetermined operation phase out of the start-up, stable lighting and power interrupt phases of the high pressure discharge lamp.

13 Claims, 12 Drawing Sheets

HIGH PRESSURE DISCHARGE LAMP LIGHTING DEVICE AND LUMINAIRE

FIELD OF THE INVENTION

The present invention relates to a high pressure discharge lamp lighting device for lighting a high pressure discharge lamp and a luminaire using the same.

BACKGROUND OF THE INVENTION

High pressure discharge lamps of compact size provide a high luminous flux, and are analogous to point light sources, and light distribution control thereof is easy. Therefore, they have been widely used as an alternative to incandescent lamps or halogen lamps in recent years.

For lighting this high pressure discharge lamp, there is a discharge lamp lighting device which switches a DC voltage on and off at high frequency and operates the high pressure discharge lamp with a low frequency square wave output via an inductor and a capacitor. When a high frequency power is used to light the high pressure discharge lamp, arc discharge may become unstable because of acoustic resonance, and the lamp may flicker or go out. However, lighting by the low frequency square wave offers a stable and continuous arc discharge.

FIG. 8 shows a circuit configuration of a conventional discharge lamp lighting device. An AC voltage output from a commercial power source 1 is rectified by a rectifier 2, smoothed by a step-up chopper circuit 3, and generated as a DC power source E by a capacitor C1. Then, the power source voltage $V_E$ of the DC power source E is converted by a DC/DC converter 4 which controls lamp current or lamp power necessary to stably light a high pressure discharge lamp La. The output thus controlled to a desired value is converted into a low frequency square wave output by a DC/AC inverter 6, and then is supplied to the high pressure discharge lamp La. For start-up of the high pressure discharge lamp La, it is necessary to induce a dielectric breakdown by a high voltage. Because of this, a high voltage pulse is generated in a starting pulse generating circuit 7 to start-up the high pressure discharge lamp La. A high voltage pulse of several to tens of kV is necessary to start-up the high pressure discharge lamp La.

The start-up of a high pressure discharge lamp is characterized by a dielectric breakdown of the high pressure discharge lamp La and its subsequent transition from a glow discharge to an arc discharge, and it is essential to control energy to be supplied under optimum conditions for individual operating states and to maintain a stable lighting state from the start-up. To this end, it is required to detect a lamp voltage, and a desired control can be realized with the help of a lighting state decision circuit (comparator CP1) which determines whether the high pressure discharge lamp La is in a lighted state or in an unlighted state, and an operating state switching control circuit (microcomputer 8) which, depending on a predetermined operation phase, switches and controls the operating state of at least one of the DC/DC converter 4, the DC/AC inverter 6, and the starting pulse generator circuit 7.

The following description will be made under the premise that microcomputer control is suitable for the control accompanied with the state transition mentioned above. The state transition of the discharge lamp La after power is applied thereto and the control required in each state will now be explained with reference to FIG. 9.

First, let "start-up phase" be defined as a state where, after power is applied, a starting pulse is outputted to incur the breakdown of the discharge lamp, and thus the glow discharge is initiated. Then, the control required in the start-up phase involves performing "the output of a starting pulse" by the starting pulse generation circuit 7, "the control of output current for the glow discharge" by the DC/DC converter 4, and "the warm-up of the lamp electrode and the low-frequency control for avoiding the lamp from going out" by the DC/AC inverter 6.

An example of the "glow discharge output current control" is shown in FIGS. 10A and 10B. When a constant current is applied to the lamp, the lamp electrode can be warmed up. For the glow discharge output current control, therefore, the constant current is applied to the lamp regardless of the lamp voltage as shown in FIG. 10A so that a lamp power is increased and decreased in proportion to the lamp voltage as shown in FIG. 10B. The lamp voltage Vg during the glow discharge is in a range from 200 V to 300 V, and the voltage increases and decreases very unstably.

Next, when a transition from a glow discharge to an arc discharge takes place, the lamp voltage instantaneously drops as shown in FIG. 9. The lamp voltage Vs at this time ranges from about 20 V to 30 V. Let "stable lighting phase" be defines as a state where the lamp voltage is stabilized towards a rated voltage Vr, following the transition to the arc discharge and the lamp is stably lighted. Then, the control required therein involves performing "the stop of the starting pulse" by the starting pulse generating circuit 7, "the control of output current for the arc discharge" by the DC/DC converter 4, and "the low-frequency control for avoiding acoustic resonance phenomena" by the DC/AC inverter 6.

An example of "the control of output current for the arc discharge" is shown in FIGS. 11A and 11B. For the control of output current for the arc discharge, a lamp current is controlled depending on the lamp voltage such that it is controlled to be kept constant particularly around a rated lamp voltage Vr, wherein the rated lamp voltage Vr is generally about 100 V.

Lastly, in the stable lighting state, when a power source voltage of the DC power source E is lowered by interruption of the power source 1, the discharge lamp is liable to be distinguished. To prevent the drop of the power source voltage as much as possible, the output power may be set lower than the rated power. In general, the output power may be about 50% of the rated power. This state may be defined as "power interrupt off phase". Then, the control required therein involves performing "the stop of the starting pulse" by the starting pulse generation circuit 7 as in the stable lighting state, "50% output power control" by the DC/DC converter 4, and "the lower-frequency control for avoiding the lamp from being extinguished" by the DC/AC inverter 6.

The control described above is illustrated in the flow chart shown in FIG. 12. After the power is applied, a threshold voltage Vth for lighting decision is set as a predetermined value Vth1 that is lower than the power source voltage of the DC power source E and higher than the rated lamp voltage Vr at the stable lighting state (step S10). The control of the lamp La is performed based on the threshold voltage Vth=Vth1 regardless of the operating state.

In the lighting deciding step S11, the lamp voltage Vla is compared with the threshold voltage Vth. If Vth>Vla (Yes in step S11), the lamp La is regarded to be in a lighted state, so the control for stable lighting is carried out in step S12. If Vth>Vla is not satisfied (No in step S11), the lamp La is regarded to be in an unlighted state, so the control for start-up is carried out in step S13 and the step goes back to step S11.

In the control for stable lighting, a detected power source voltage Vb is compared with a reference voltage Vref in step S14. If Vref>Vb (yes in step S14), it is regarded as a power interrupt state, so the control for power interrupt (dimming) is carried out in step S15 and the step goes back to step S11. If Vref>Vb is not satisfied in step S14, it is not regarded as a power interrupt state, so the control for stable lighting is continued (step S16) and the step goes back to step S11.

A technique of switching and controlling the operating state of a lighting device depending on the state of a discharge lamp, e.g., a lamp voltage, as explained above is disclosed in, e.g., Japanese Patent Laid-open Application Nos. H09-069395, H07-106071 and 2007-257989.

Disclosed in H09-069395 is a technique that changes the output characteristics of the DC/DC converter depending on the voltage of the lamp at its start-up stage and in a final stage of life span, though it is not directly responding to a lamp voltage change during the start-up. Disclosed in H07-106071 is a technique that detects a lamp voltage to control the operation/stop of the start-up pulse generating circuit, based on the detected lamp voltage. Disclosed in 2007-257989 is a technique that allows the output power to be lower than the rated output in a power interrupt state.

In these conventional techniques, a threshold for deciding whether the discharge lamp is in a lighted state or not is set as a single predetermined value Vth1 that is designated by referencing only for the "stable lighting state", wherein the threshold Vth1 is typically set higher than the rated lamp voltage Vr during the stable lighting state and lower than the power source voltage $V_E$ of the DC power source E, i.e., Vr<Vth1<$V_E$. The rated lamp voltage Vr during the stable lighting state is in the range from about 100 V to 150 V provided that the last stage of lamp life span is also taken into consideration, and the power source voltage $V_E$ of the DC power source E is in the range from about 300 V to 450 V when conditions such as AC input voltage and the like are taken into account consideration. Therefore, Vth1 is in the range of 150 V<Vth1<300V, and, typically, Vth1 is designed in the range from about 200 V to 250 V. This value is an optimum threshold in the "stable lighting phase".

One of reasons not considering the threshold voltages for the cases such as "start-up phase" and "power interrupt phase" defined earlier is because the "start-up phase" lasts only for a very short period of time, so that the control during that short period of time may not be considered as of great importance. Also, the "power interrupt phase" may not also be regarded as of great importance because the circuit normally turns to its stop direction after that phase.

However, when a lamp in the final stage of its life span or a lamp of poor start-up performance is combined with such a discharge lamp lighting device described above, the "start-up phase" may last for a long time, and the state of the discharge lamp may not be correctly recognized during that time. Therefore, it may not be properly controlled to perform an originally expected operation so that the start-up failure may occur or stable lighting may not be possible. Moreover, the "power interrupt phase" also has to deal with instantaneous power failure including a case where power is temporarily turned off for a very short period of time and then turned on immediately thereafter. In such a case, it is difficult for the conventional lighting device to correctly recognize the state of the discharge lamp, so that undesirable control other than the expected operation may be made due to incorrect recognition.

SUMMARY OF THE INVENTION

In view of the above, the present invention provides a high pressure discharge lamp lighting device capable of making a stable state decision depending on the state of a high pressure discharge lamp or the state of a power source and stably lighting the discharge lamp.

In accordance with a first aspect of the present invention, there is provided a high pressure discharge lamp lighting device, including: a DC/DC converter for converting a power source voltage of a DC power source into a desired DC voltage and stably lighting a high pressure discharge lamp; a DC/AC inverter for inverting the DC voltage into an AC voltage; a starting pulse generating circuit for generating a high voltage required for the start-up of the high pressure discharge lamp; a lighting state decision unit for deciding a lighted/unlighted state of the high pressure discharge lamp by detecting a lamp voltage and then comparing a detected value of the lamp voltage with a predetermined decision threshold; and an operating state switching control unit for switching an operating state of at least one of the DC/DC converter, the DC/AC inverter, and the starting pulse generating circuit to another operating state, depending on a predetermined operation phase out of the start-up, stable lighting and power interrupt phases of the high pressure discharge lamp, and controlling the operating state, wherein the decision threshold changes for each operation phase.

Further, it is preferable that, in the start-up operation phase of the discharge lamp among the predetermined operation phases, where the discharge lamp undergoes a dielectric breakdown by the starting pulse and a transition from a glow discharge to an arc discharge takes place, the decision threshold voltage is set lower than a decision threshold voltage in the stable lighting operation phase after the arc discharge is carried out.

It is preferable that in the operation phase during the discharge lamp start-up, the decision threshold voltage is set sufficiently lower than a glow discharge voltage of the discharge lamp.

Further, it is preferable that a power source voltage decision circuit for deciding a voltage state of the DC power source is provided and, in the power interrupt operation phase among the predetermined operation phases, where the power source voltage of the DC power source is below a predetermined value, the decision threshold voltage is set lower than a decision threshold voltage in the stable lighting operation phase.

It is preferable that the decision threshold voltage is set to become relatively low in the power interrupt operation phase depending on a decrease in the power source voltage of the DC power source.

In accordance with a second aspect of the present invention, there is provided a luminaire having the high pressure discharge lamp lighting device described above.

As described above, the present invention changes the decision threshold to an optimum value for every predetermined operation phase based on the state of a high pressure discharge lamp or the state of a power source, thereby making a very stable state decision and stably lighting the discharge lamp under the control required by the invention.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
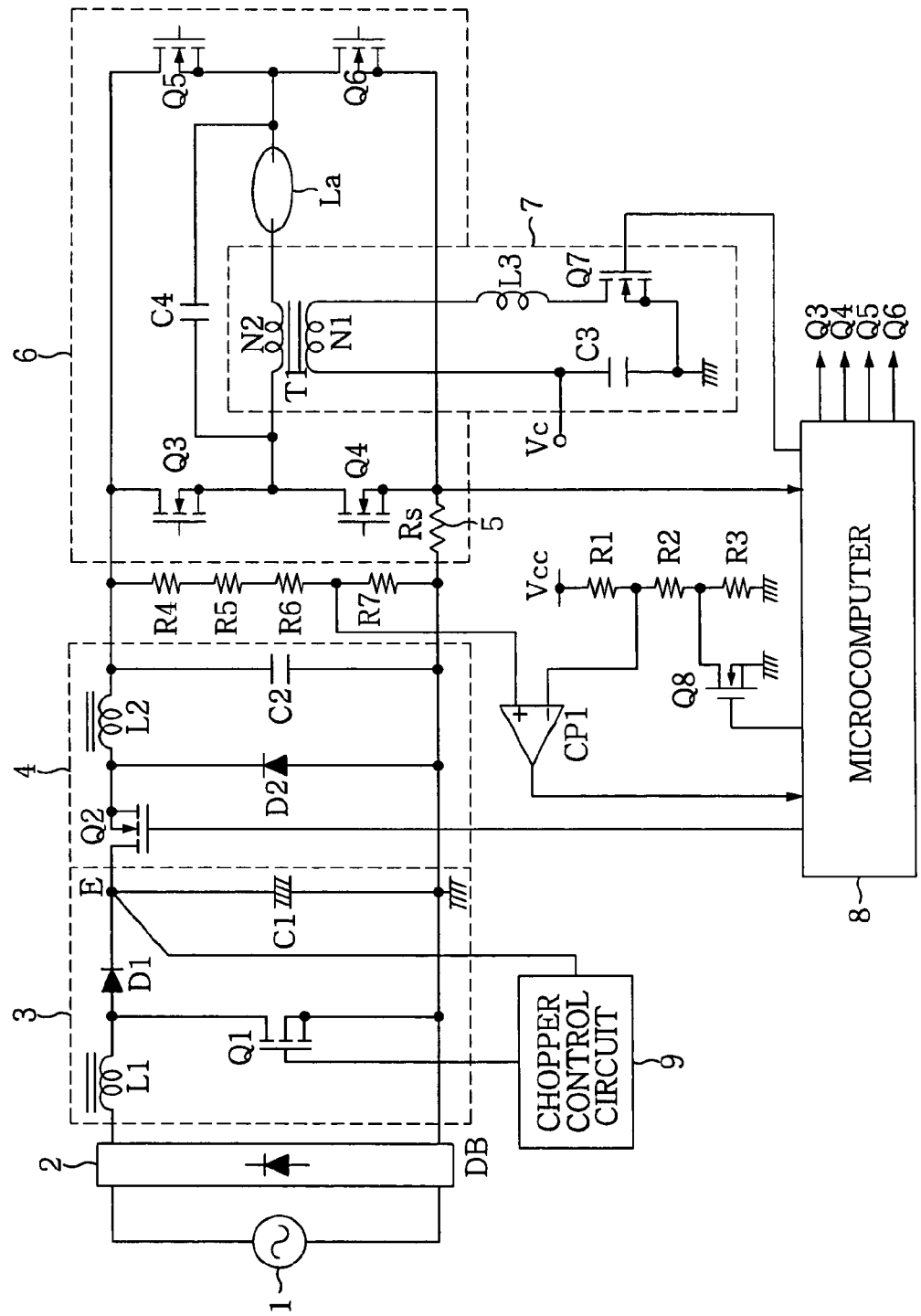
FIG. 1 is a circuit diagram showing a configuration of a first embodiment of the present invention.

Hereinafter, embodiments of the present invention will be described in detail with reference to the accompanying drawings which form a part hereof.

It is very crucial to correctly recognize the state of the discharge lamp even for other phases than the stable lighting phase. Here, considering a decision threshold in order to correctly recognize the state of the discharge lamp even during the "start-up phase" after the glow discharge state, as mentioned before, a lamp voltage Vg in the glow discharge state during the start-up phase ranges from 200 V to 300 V, and the rated lamp voltage Vr in the stable lighting phase ranges from 100 V to 150 V after taking the final stage of the lamp's life into consideration. Then, a threshold voltage Vth2, which decides the state between the glow discharge state in the "start-up" phase and the stable lighting state in the "stable lighting phase" may be defined by the relation of Vr<Vth2<Vg, and has a value of very narrow range, i.e., 150 V<Vth2<200V. In addition, as explained earlier, the lamp voltage Vg in the glow discharge state is very unstable, so one may easily guess that it would be below 200V, and thus it is hard to say that the range from 150 V to 200 V ensures a sufficient design margin.

On the other hand, in the transition from the glow discharge to the arc discharge, it is well known that the lamp voltage is transited to the rated lamp voltage Vr after it first drops to a low voltage Vs ranging from about 20 V to 30 V, which is the characteristic of high pressure discharge lamp. That is, in the transition from the glow discharge to the arc discharge, a decision threshold value Vth3 may be defined by the relation of Vs<Vth3<Vg, where Vth3<Vth1. Also, the range of Vth3 falls between 30V and 200 V (30 V<Vth3<200V), which covers a very wide range.

Meanwhile, what becomes a problem when considering the set-up of a decision threshold to correctly recognize the state of the discharge lamp even in the "power interrupt phase" is that if the power source voltage $V_E$ of the DC power source E is determined below the decision threshold and if the DC/DC converter 4 is a step-down chopper circuit, an unlighted lamp may erroneously be regarded as a lighted lamp, since the lamp voltage cannot exceed an input power source voltage. This may also be explained from the fact that if the voltage $V_E$ of the DC power source E drops below the preset threshold Vth1 during the power interrupt phase, Vth1<E of the aforementioned condition of Vr<Vth1<E cannot be satisfied.

Considering the original object to be attained, such erroneous decision can be avoided by lowering the decision threshold depending on a decrease in the power source voltage $V_E$. At least during the power interrupt phase, it is advantageous to set the decision threshold below a lowered power source voltage $V_{E'}$ ($<V_E$) to avoid the erroneous decision. That is, for the state transition during power interrupt phase, the decision threshold Vth4 may be defined by Vr<Vth4<$V_{E'}$, where Vth4<Vth1. Also, the range of Vth4 is from about 100 V to 200 V (100 V<Vth4<200 V).

Such operation in the "power interrupt phase" is similarly performed when the power source voltage is off as well as when the power source voltage becomes excessively low because of, for example, a sudden change in load.

First Embodiment

FIG. 1 is a circuit diagram of a first embodiment of the present invention. Hereinafter, a configuration of the circuit will be described in detail. A DC power source E corresponds to a DC voltage of a smoothing capacitor C1, the voltage being obtained by rectifying and smoothing a commercial AC power source 1, and an output voltage of a step-up chopper circuit 3 connected to an output of a diode bridge DB. However, the DC power source E is not limited thereto, but may be a battery or any of commercial DC power source.

A rectifier 2 which includes the diode bridge DB full-wave rectifies the commercial AC power source 1 to output a ripple voltage. A series circuit of an inductor L1 and a switching element Q1 is connected to an output end of the diode bridge DB. The smoothing capacitor C1 is connected to both ends of the switching element Q1 via a diode D1. The inductor L1, the switching element Q1, the diode D1, and the smoothing capacitor C1 constitute the step-up chopper circuit 3.

The switching element Q1 is turned ON and OFF under the control of a chopper control circuit 9. The chopper control circuit 9 can easily be implemented by using a commercially available IC circuit (e.g., MC 33262 and the like). As the ON/OFF control of the switching element Q1 takes place at a frequency that is sufficiently higher than the commercial frequency of the commercial AC power source 1, an output voltage of the diode bridge DB is stepped up to a required DC voltage to be stored in the smoothing capacitor C1 and, a control for power factor improvement that grants resistance to the circuit that can prevent an input current and an input voltage from the commercial AC power source 1 from being out of phase is carried out. In addition, a filter circuit for restraining a high frequency leakage may be provided at the AC input end of the diode bridge DB.

A DC/DC converter 4, i.e., step-down chopper circuit serving as a power converting circuit is connected to the DC power source E. The DC/DC converter 4 has a function of a stabilizer for supplying a target power to the high pressure discharge lamp La serving as a load. Also, an output voltage of the DC/DC converter 4 is variably controlled to supply an optimal power to the high pressure discharge lamp La from the start-up phase to the stable lighting phase, through an arc discharge transition period.

A circuit configuration of the DC/DC converter 4 will now be described. A positive electrode of the smoothing capacitor C1 corresponding to the DC power source E is connected to a positive electrode of a capacitor C2 via a switching element Q2 and an inductor L2; and a negative electrode of the capacitor C2 is connected to a negative electrode of the smoothing capacitor C1. An anode of a diode D2 for conducting recovery current is connected to a negative electrode of the capacitor C2, and a cathode of the diode D2 is connected to a connecting point of the switching element Q2 and inductor L2.

An operation of the DC/DC converter 4 will now be described. The switching element Q2 is turned ON and OFF at a high frequency by a control signal from a microcomputer 8. When the switching element Q2 is ON, a current from the DC power source E flows through the switching element Q2, the inductor L2 and the capacitor C2; and when the switching element Q2 is OFF, a recovery current flows through the inductor L2, the capacitor C2 and the diode D2. Thus, a DC voltage, which is a stepped down DC voltage of the DC power source E, is stored in the capacitor C2. By changing the ON duty (the ratio of ON time within one cycle) of the switching element Q2 by the microcomputer 8, the voltage obtained at the capacitor C2 can be variably controlled.

An output of the DC/DC converter 4 is connected to a DC/AC inverter 6, i.e., a polarity inverting circuit. The DC/AC inverter 6 is a full bridge circuit including switching elements Q3 to Q6. As the switching element pair Q3 and Q6 and the switching element pair Q4 and Q5 are alternately turned ON at a low frequency by a control signal from the microcomputer 8, the output power of the DC/DC converter 4 is converted into a square wave AC power and supplied to the high pressure discharge lamp La. The high pressure discharge lamp La serving as a load is a high-brightness high-intensity discharge (HID) lamp such as a metal halide lamp or a high pressure mercury lamp.

A starting pulse generation circuit 7 operates only during the start-up of the high pressure discharge lamp La to generate a high-intensity pulse voltage for the dielectric breakdown of the high pressure discharge lamp La. The starting pulse generating circuit 7 includes a transformer primary coil circuit which connects a capacitor C3 charged at a certain voltage value Vc; a primary coil N1 of a transformer T1; an inductor L3; and a switching element Q7 which is turned ON/OFF by a control signal from the microcomputer 8; in series; and a secondary coil N2 of the transformer T1, which steps up a pulse voltage generated at the primary coil of the transformer T1 by N2/N1 times, wherein N2/N1 is a winding ratio between the primary coil N1 and the secondary coil N2 and the transformer coupling coefficient is assumed to be 1. The secondary coil N2 serves to superpose the high-intensity pulse voltage on an output of the DC/AC inverter 6 to apply a high-intensity pulse voltage to the high pressure discharge lamp La.

A capacitor C4 is a high frequency bypass capacitor which blocks a high voltage pulse generated from the transformer T1 from returning towards an input side of the DC/AC inverter 6. The capacitor C4, a secondary coil N2 of the transformer T1 and the high pressure discharge lamp La constitutes a closed series circuit. When a high-intensity pulse voltage is generated from the secondary coil N2 of the transformer T1, it is applied to both ends of the high pressure discharge lamp La via the capacitor C4.

The microcomputer 8, which forms an output control circuit, outputs a control signal for properly controlling the switching element Q2 of the DC/DC converter 4 and the switching elements Q3 to Q6 of the DC/AC inverter 6, depending on the state of the high pressure discharge lamp La. The microcomputer 8 monitors the load current flowing through a resistor Rs, which is a current detection resistor 5, and controls the ON duty of the switching element Q2 of the DC/DC converter 4 to make sure that an optimal power is supplied to the high pressure discharge lamp La. Also, the microcomputer 8 controls the switching elements Q3 to Q6 to be turned ON and turned OFF at a low frequency.

The output voltage of the DC/DC converter 4 is divided by the series circuit of resistors R4, R5, R6 and R7 and then applied to a non-inverting input terminal of a comparator CP1. Also, applied to an inverting input terminal of the comparator CP1 is a threshold voltage for making a decision on the lighting state, the threshold voltage being obtained by dividing a control power source voltage Vcc by resistors R1, R2 and R3. A switching element Q8 is connected in parallel to both ends of the resistor R3. In this way, as the ON/OFF of the switching element Q8 is controlled by a lighting decision signal outputted from the microcomputer 8, it becomes possible to switch the threshold voltage for making a decision on the lighting state, which is applied to the inverting input terminal of the comparator CP1.

When the high pressure discharge lamp La is lighted, its lamp impedance is small, so a voltage on the capacitor C2, which is an output of the DC/DC converter 4, is lowered. If a voltage to the non-inverting input terminal of the comparator CP1, which is obtained by dividing the voltage on the capacitor C2 and serves as a detected lamp voltage VLa is lower than a voltage to the inverting input terminal, the output of the comparator CP1 becomes an L (low) level and it is decided that the high pressure discharge lamp La is in a lighted state. When the high pressure discharge lamp La is not lighted, the lamp impedance is large, so the voltage on the capacitor C2, which is the output of the DC/DC converter 4, is increased. If the voltage to the non-inverting input terminal of the comparator CP1 which is obtained by dividing the voltage on the capacitor C2 is equal to or higher than the voltage on the inverting input terminal, the output of the comparator CP1 becomes an H (high) level and it is decided that the high pressure discharge lamp La is in an unlighted state. In this way, the circuit including the comparator CP1 and voltage-dividing resistors R1 to R7 may serve as a lighting state decision circuit. A single resistor may be used in lieu of the resistor R4 to R6 connected in series.

In the embodiment shown, the comparator CP1 makes a decision on the lamp voltage, but any software that obtains a lamp voltage by the A/D conversion input port (not shown) of the microcomputer 8 may do the same. For instance, the voltage divided by the resistors R4 to R7 is taken as a digital value by the A/D conversion input port of the microcomputer 8, and may be used for the control of lamp power and compared with the threshold for lighting decision, thereby distinguishing a lighted state from an unlighted state.

Figure 2:
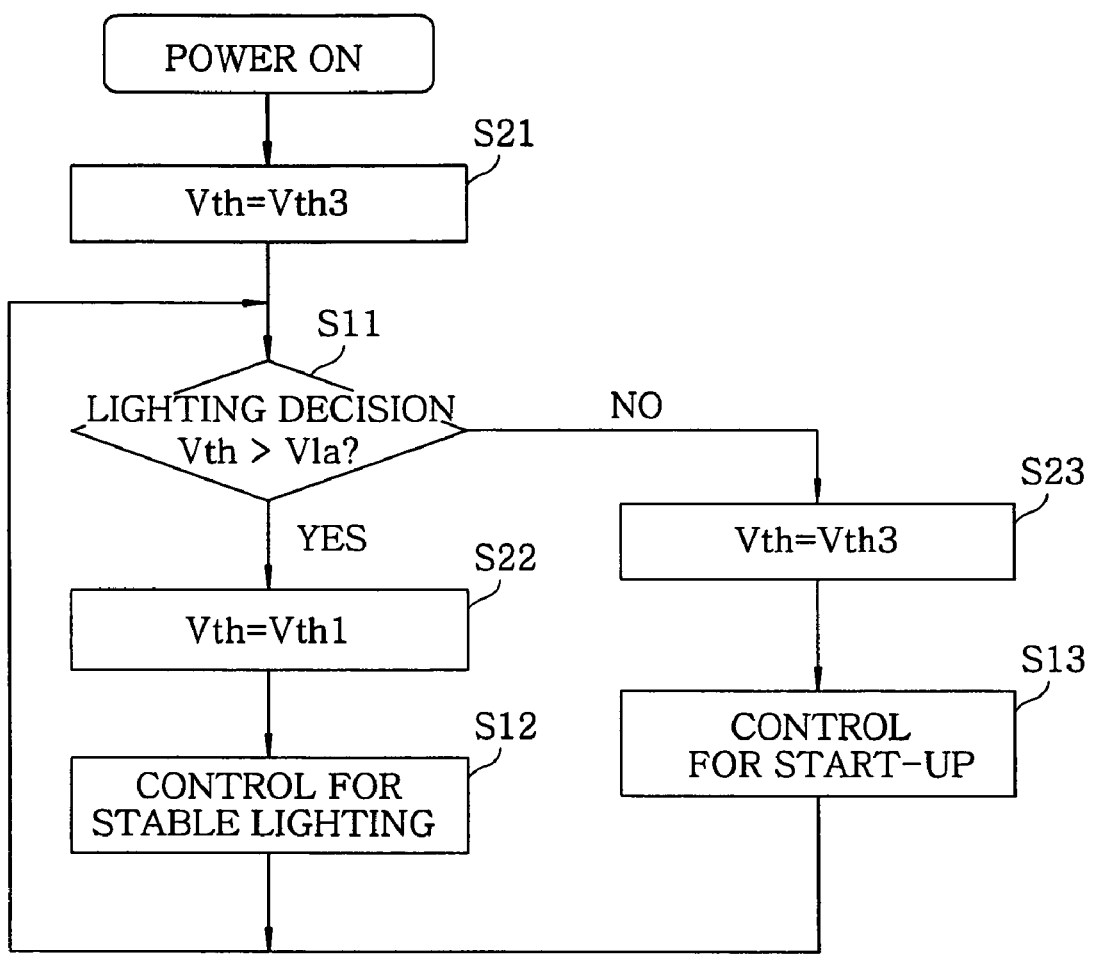
FIG. 2 is a flow chart for explaining an operation of the first embodiment of the present invention.

FIG. 2 is a flow chart for explaining an operation of this embodiment. An initial threshold Vth3 is set higher than the lamp voltage Vs during the start-up and lower than the lamp voltage Vg during the glow discharge. A threshold Vth1 set after making the lighting decision set higher than the rated lamp voltage Vr and lower than the input power source voltage $V_E$ of the DC/DC converter 4. It is suitable for the initial threshold Vth3 to be lower than the threshold Vth1 set after making the lighting decision and Vth1 and Vth3 are, for example, in the ranges of 150 V<Vt1<300 V and 30 V<Vth3<200 V.

Specifically, after the power is applied, the microcomputer turns on the switching element Q8 to set a threshold voltage Vth for lighting decision as the initial threshold Vth3 (step S21). In the lighting decision step S11, the lamp voltage Vla is compared with the threshold voltage Vth. If Vth>Vla (Yes in step S11), the lamp La is regarded to be in a lighted state, so the microcomputer 8 turns off the switching element Q8 to set Vth=Vth1 in step S22. Then the control for stable lighting is carried out in step S12 and the process returns to step S11. If Vth>Vla is not satisfied (No in step S11), the lamp La is regarded to be in an unlighted state, so the microcomputer 8 turns on the switching element Q8 to set Vth=Vth3, then the control for start-up is carried out in step S13 and the process returns to step S1.

Second Embodiment

Figure 3:
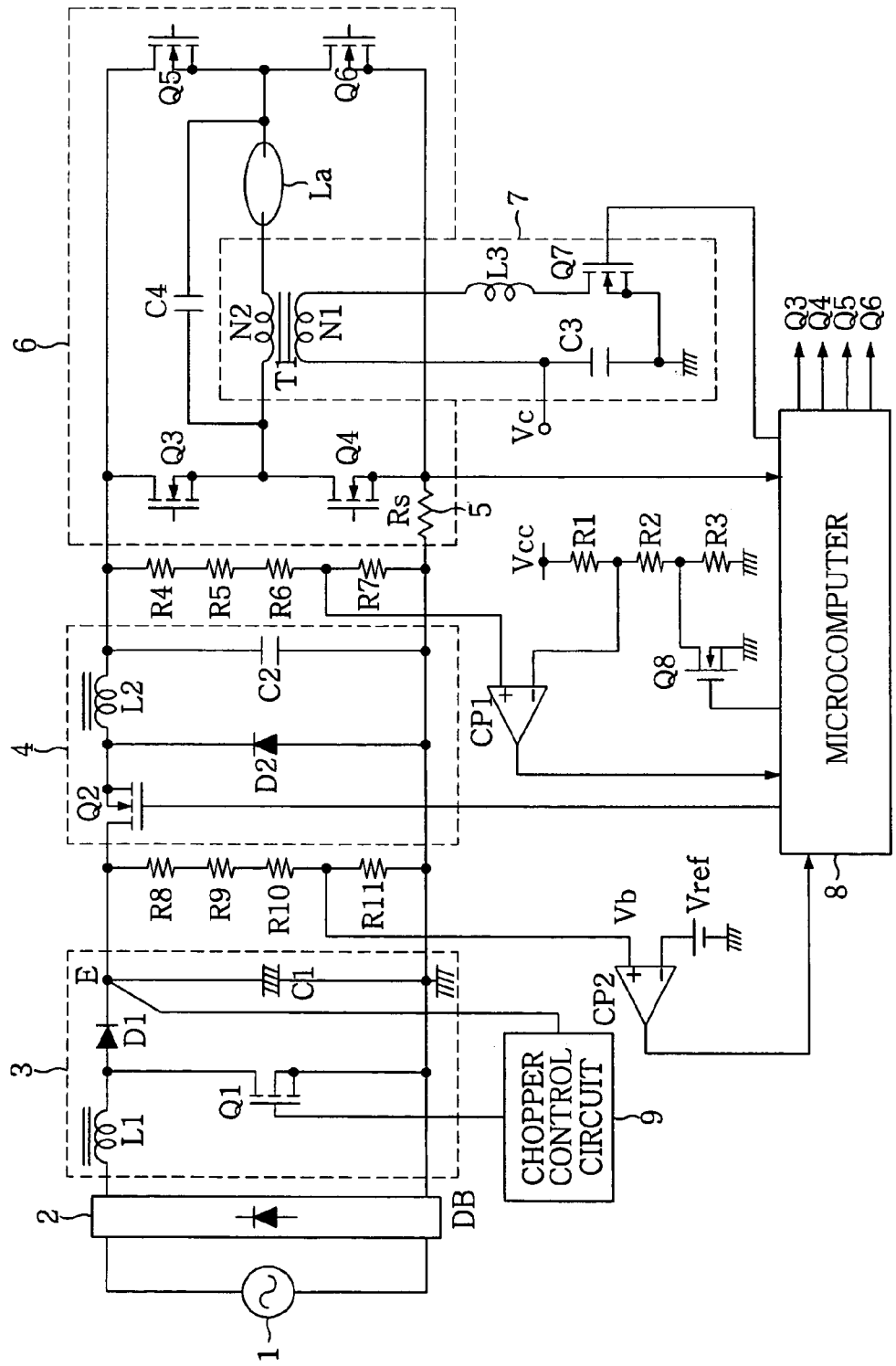
FIG. 3 is a circuit diagram showing a configuration of a second embodiment of the present invention.

FIG. 3 is a circuit diagram of a second embodiment of the present invention. This embodiment further includes, in addition to the configuration of the first embodiment, a comparator CP2 for deciding a power source voltage and voltage-dividing resistors R8 to R11, thereby deciding an input power source voltage $V_E$ from the DC power source E to the DC/DC converter 4. The input power source voltage $V_E$ is divided by a series circuit of the resistors R8 to R11 and then applied as a detected power source voltage Vb to a non-inverting input terminal of the comparator CP2. A reference voltage Vref is applied to the inverting input terminal of the comparator CP2. If Vb<Vref, an output of the comparator CP2 becomes an L level, which is then decided as the power interrupt phase. By monitoring an output of the comparator CP2 on a regular basis, the microcomputer 8 switches the ON/OFF of the switching element Q8 such that the output to the inverting input terminal of the comparator CP1 may become Vth4 in the power interrupt phase and Vth1 in the stable lighting phase, and switches the threshold of the comparator CP1 for deciding the lighting state. A single resistor may also be used instead of the resistors R8 to R10 connected in series. The resistors R1 to R3 in the second embodiment may be configured to have different resistances from R1 to R3 in the first embodiment to make Vth3 in the first embodiment be different from Vth4 in the second embodiment.

Figure 4:
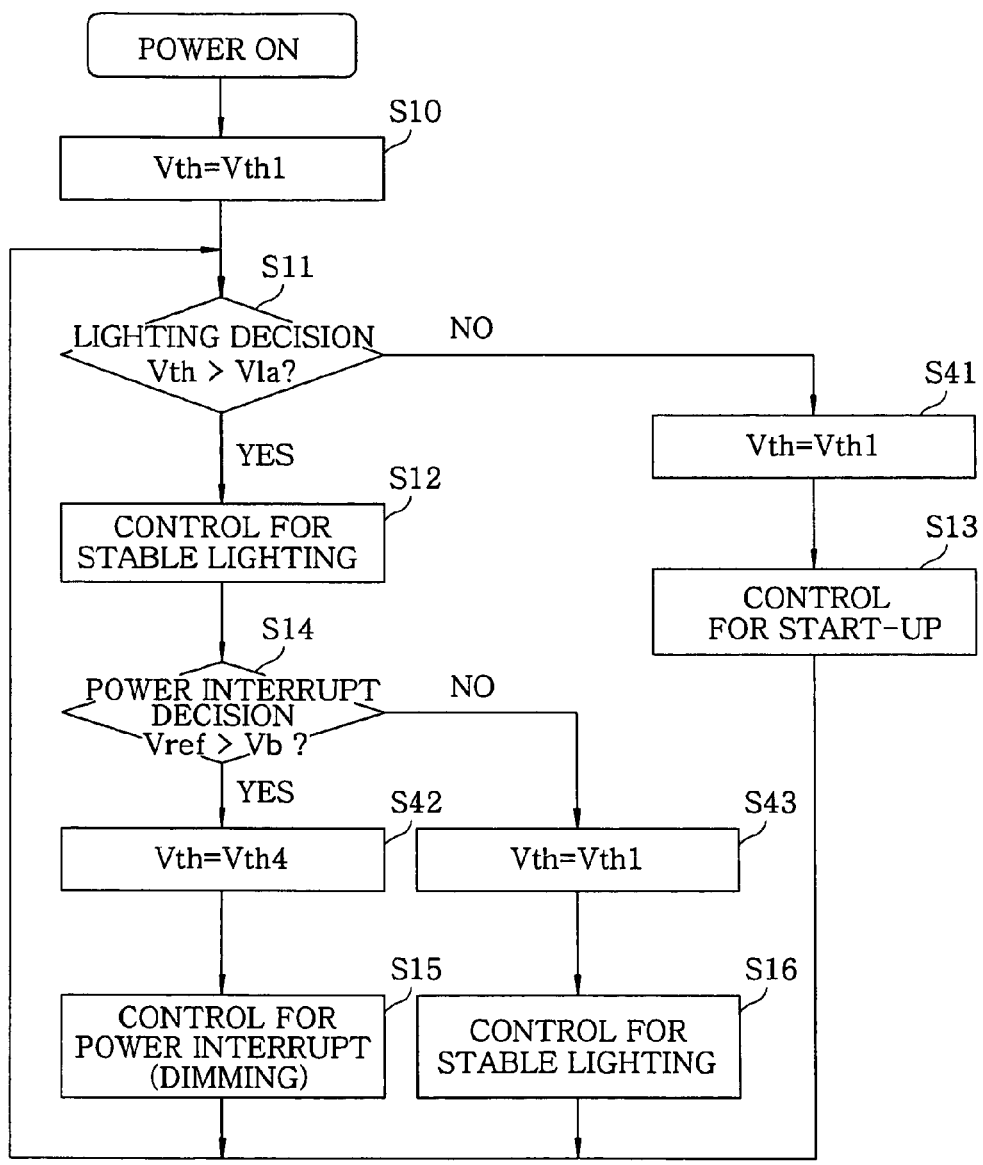
FIG. 4 is a flow chart for explaining an operation of the second embodiment of the present invention.

FIG. 4 is a flow chart for explaining an operation of this embodiment. The threshold Vth1 in the stable lighting phase is set higher than the rated lamp voltage Vr and lower than the input power source voltage $V_E$ of the DC/DC converter 4. The threshold Vth4 during the power interrupt phase is set higher than the rated lamp voltage Vr and lower than an input power source voltage $V_E'$ of the DC/DC converter 4 during the power interrupt. It is suitable for the threshold Vth4 during the power interrupt phase to be lower than the threshold Vth1 during the stable lighting phase and Vth1 and Vth2 are, for example, in the ranges of 150 V<Vt1<300V, while 100V<Vth4<200 V.

Specifically, after the power is applied, Vth for lighting decision is set as Vth1 (step S21). In the lighting decision step S11, the lamp voltage Vla is compared with the threshold voltage Vth. If Vth>Vla (Yes in step S11), the lamp La is regarded to be in the lighted state, so the control for stable lighting is carried out in step S12. If Vth>Vla is not satisfied (No in step S11), the lamp La is regarded to be in the unlighted state, so the microcomputer 8 turns off the switching element Q8 to set Vth=Vth1 and the control for start-up is carried out in step S13 and the process goes back to step S11. In the control for stable lighting, a detected power source voltage Vb is compared with the reference voltage Vref in step S14. If Vref>Vb (Yes in step S14), it is regarded as a power interrupt state, so the microcomputer 8 turns on the switching element Q8 to set Vth=Vth4. Then the control for power interrupt (dimming) is carried out in step S15 and the process goes back to step S11. If Vref>Vb is not satisfied in step S14, it is not regarded as a power interrupt state, so Vth is set as Vth1. Then, the control for stable lighting is continued (step S16) and the process goes back to step S11.

Third Embodiment

Figure 5:
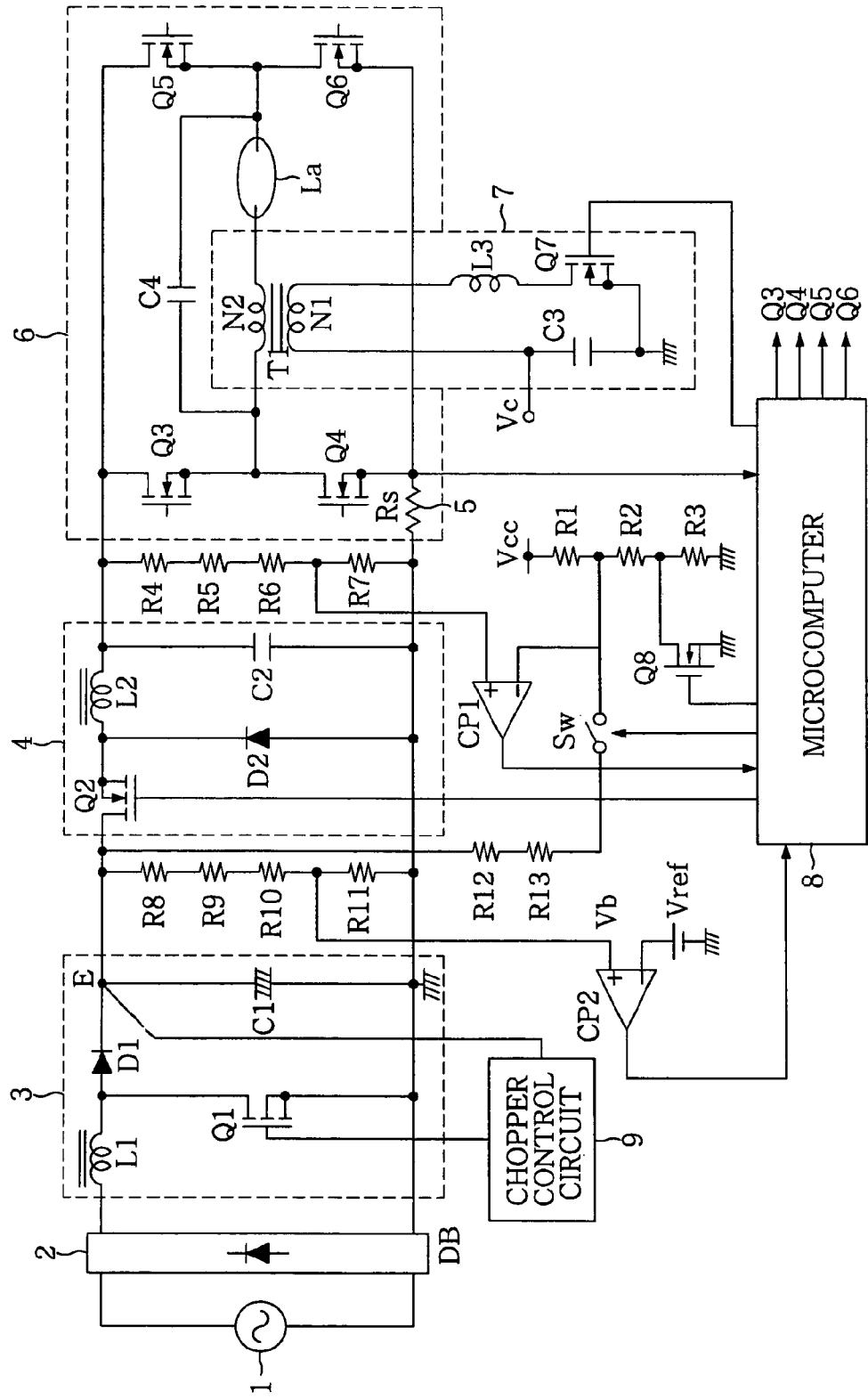
FIG. 5 is a circuit diagram showing a configuration of a third embodiment of the present invention.

FIG. 5 is a circuit diagram of a third embodiment of the present invention. In addition to the configuration of the second embodiment, a switching element Sw of a power source bias circuit connected to the power source E is turned ON/OFF by a lighting decision signal from the microcomputer 8, thus reflecting a change in the power source voltage $V_E$ on the threshold value for making a decision on the lighting state. When the switching element Sw is ON, a bias current that depends on the DC voltage of the DC power source E is supplied to a connecting point of the resistors R1 and R2 via a series circuit of the resistors R12 and R13, to variably control the threshold value used for making a decision on the lighting state based on the power source voltage. That is, this embodiment can be configured in a manner that the threshold voltage is lowered as the power source voltage decreases. The resistor R1 and R2 may be replaced with a single resistor.

Figure 6:
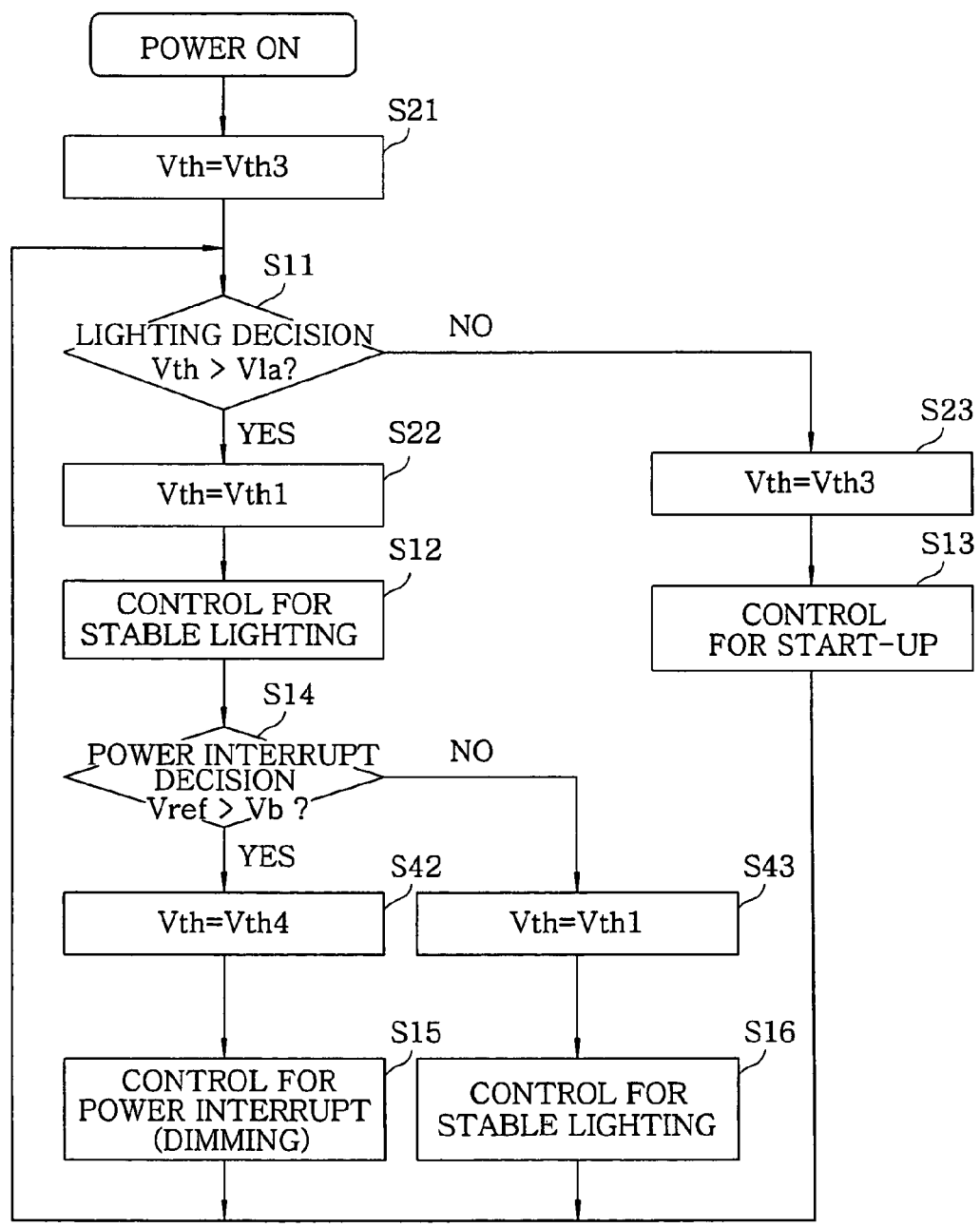
FIG. 6 is a flow chart for explaining an operation of a fourth embodiment of the present invention.

FIG. 6 is a flow chart for explaining a combination of the first and the second embodiment described above. As in the first embodiment, the initial threshold used for making a decision on the lighting state is preset to Vth3, and then switched to Vth1 as the phase goes to the stable lighting phase, based on the lighting decision result. After that, when the power interrupt phase is recognized, the threshold used for making a decision on the lighting state is changed to Vth4. In this embodiment, Vth4 may be obtained by turning on both of the switching elements Sw and Q8 and Vth3 may be obtained by turning off the switching element Sw and turning on the switching element Q8.

The threshold Vth1 during the stable lighting phase is set higher than the rated lamp voltage Vr and lower than an input voltage $V_E$ from the power source E to the DC/DC converter 4. The initial threshold Vth3 is set higher than the lamp voltage Vs during the start-up and lower than the lamp voltage Vg during the glow discharge. The threshold Vth4 in the power interrupt phase is set higher than the rated lamp voltage Vr and lower than the input power source voltage $V_E'$ of the DC/DC converter 4 during the power interrupt. Both the initial threshold Vth3 and the threshold Vth4 during the power interrupt are lower than the threshold Vth1 in the stable lighting phase. As one example, suitable thresholds satisfy relations of 150V<Vth1<300 V, 30 V<Vth3<200 V and 100 V<Vth4<200 V.

Fourth Embodiment

Figure 7A:
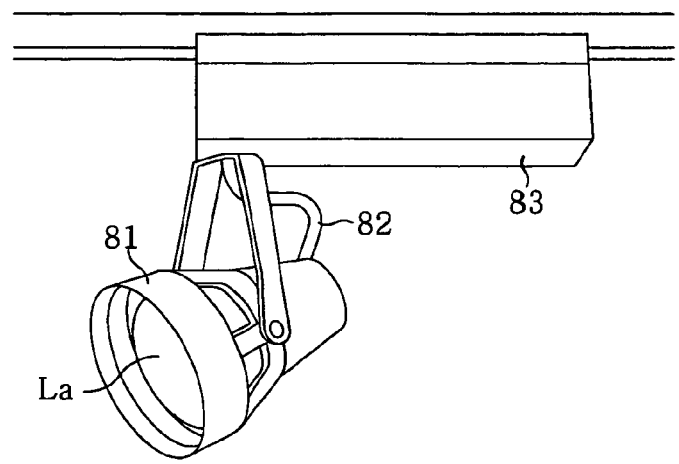
FIG. 7A to 7C are a perspective views of luminaires in accordance with a fifth embodiment of the present invention.
Figure 7B:
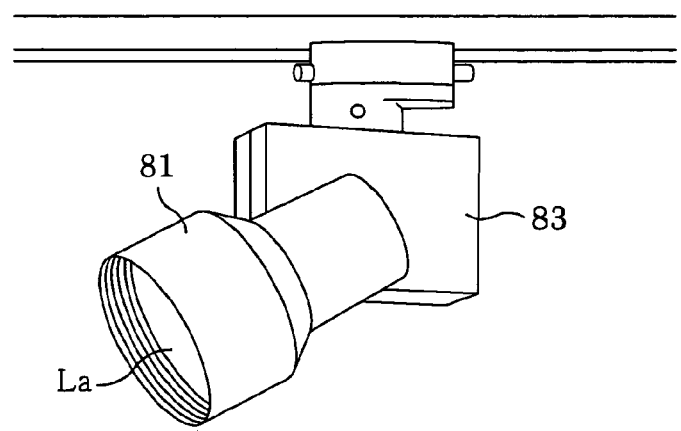
Figure 7C:
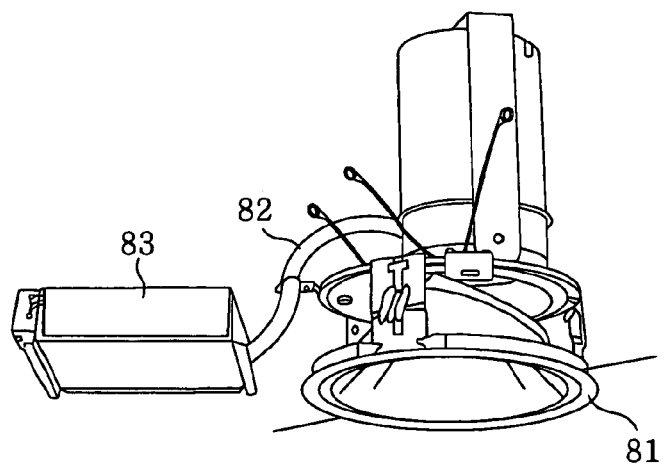
Figure 8:
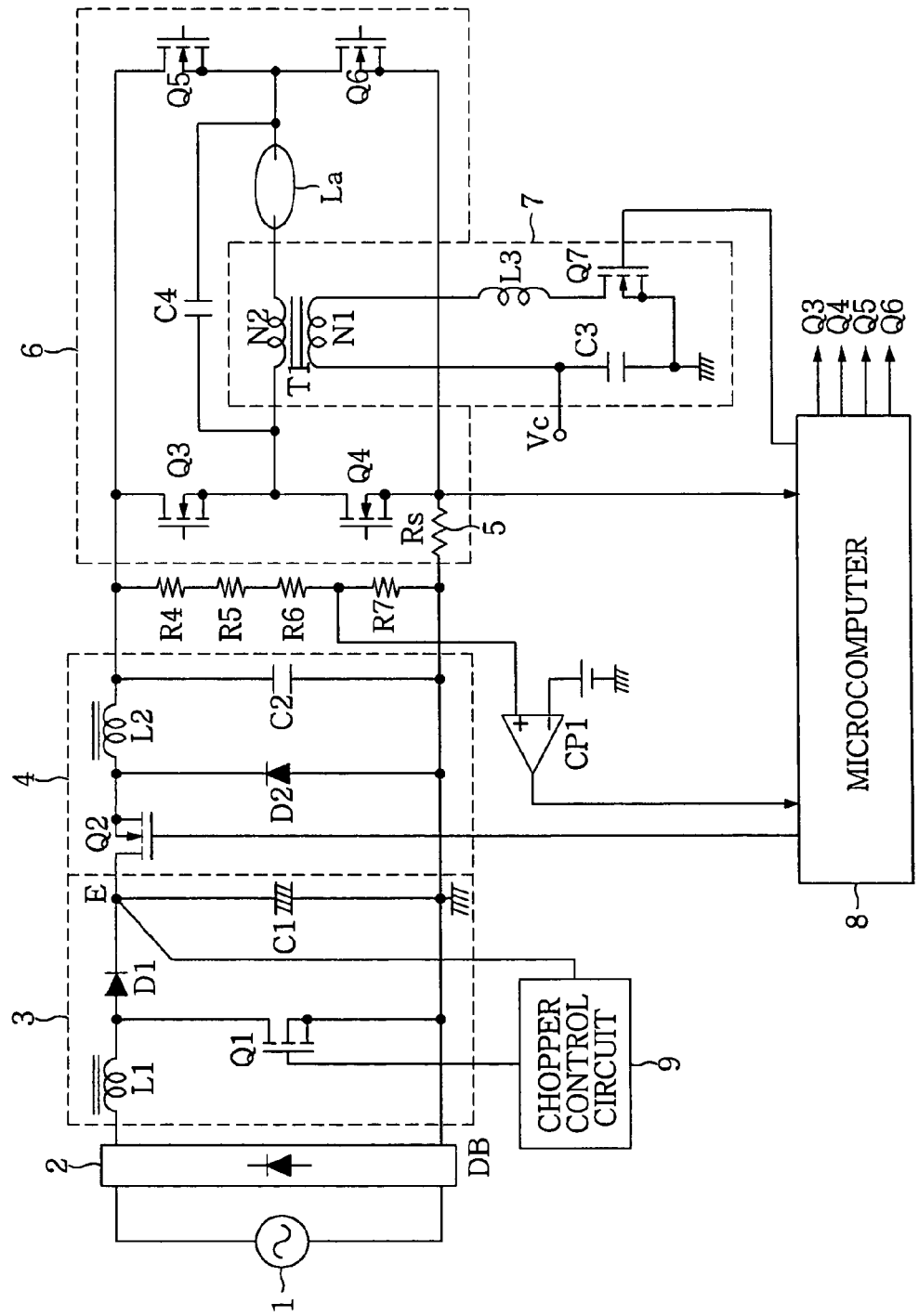
FIG. 8 is a circuit diagram of a conventional art.
Figure 9:
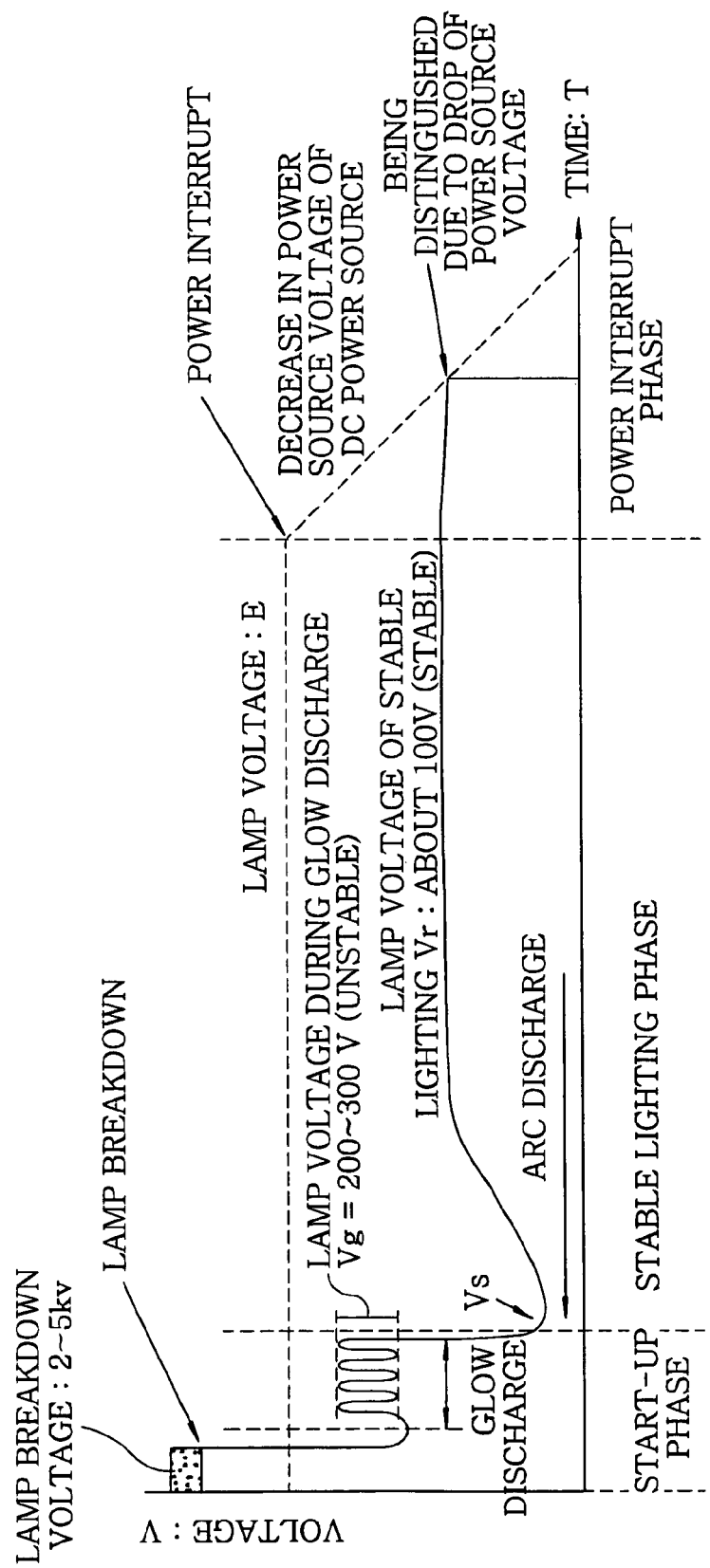
FIG. 9 is an explanatory view of temporal changes in a lamp voltage in the conventional art.
Figure 10A:
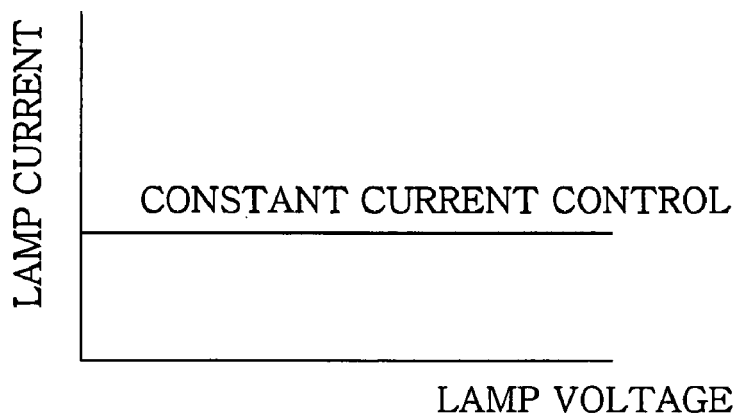
FIGS. 10A and 10B are explanatory views of a control of a glow discharge in the conventional art.
Figure 10B:
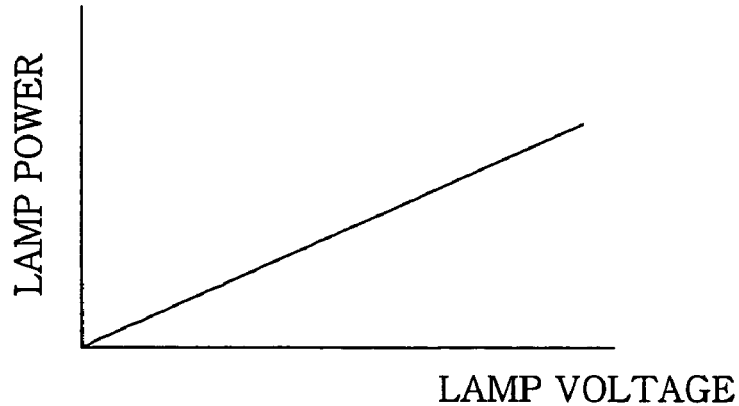
Figure 11A:
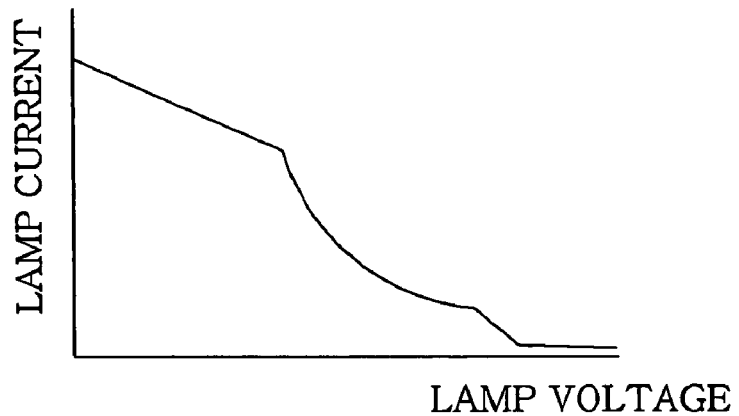
FIGS. 11A and 11B are an explanatory views of a control of arc discharge in the conventional art.
Figure 11B:
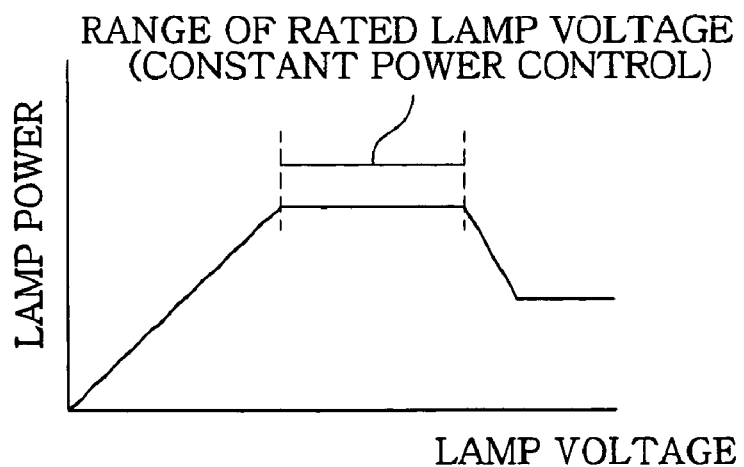
Figure 12:
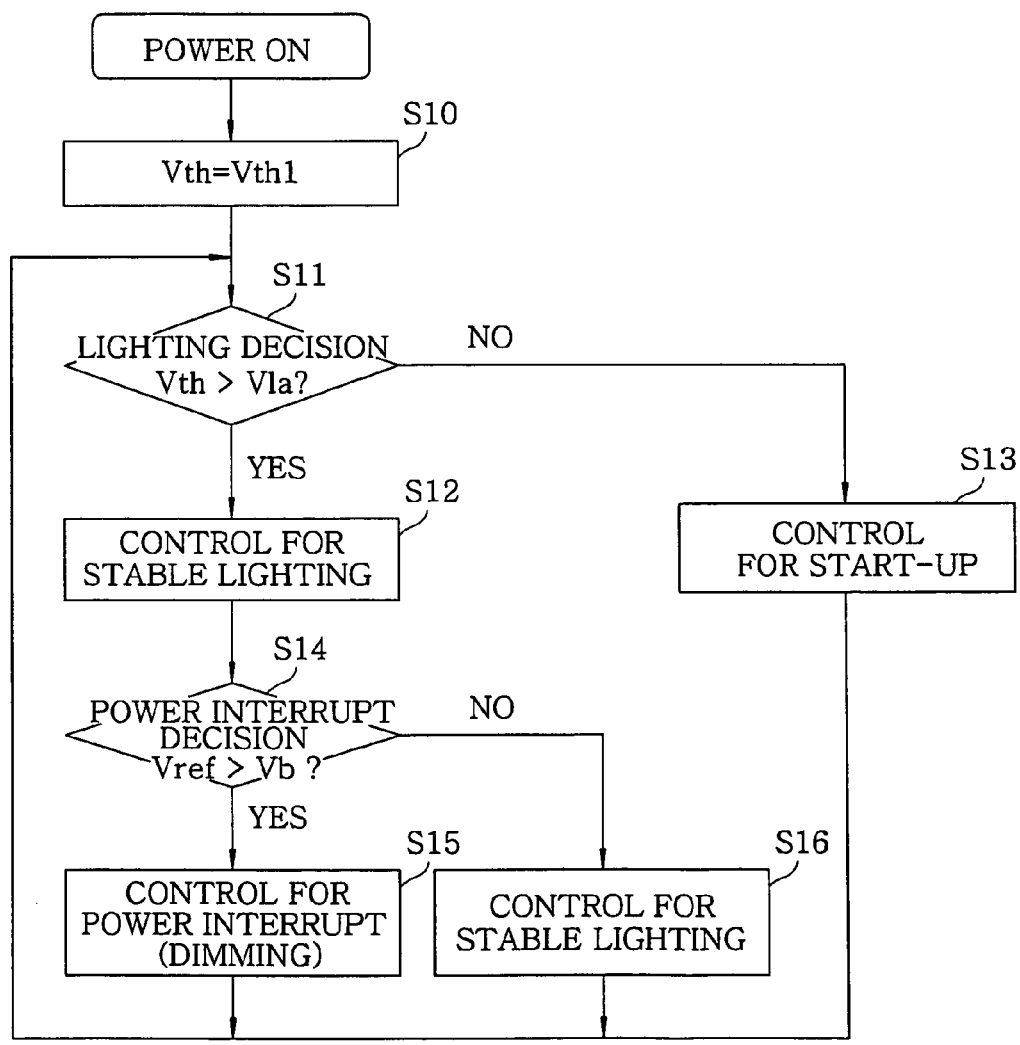
FIG. 12 is a flow chart for explaining an operation of the conventional art.

FIG. 7A to 7C show an exemplary configuration of a luminaire using the high pressure discharge lamp lighting device of the present invention. FIGS. 7A and 7B show an example of using HID lamps as spot lights, and FIG. 7C shows an example of using an HID lamp for a down light, where La indicates a high pressure discharge lamp, reference numeral 81 indicates a luminaire body having a high pressure discharge lamp mounted thereon, reference numeral 82 indicates a wire, and reference numeral 83 indicates a stabilizer having a circuit of the lighting device is kept therein. A plurality of such luminaires may be combined to build a lighting system.

While the invention has been shown and described with respect to the embodiments, it will be understood by those skilled in the art that various changes and modification may be made without departing from the scope of the invention as defined in the following claims.

What is claimed is:
1. A high pressure discharge lamp lighting device, comprising:
 a DC/DC converter for converting a power source voltage of a DC power source into a desired DC voltage and stably lighting a high pressure discharge lamp;

a DC/AC inverter for inverting the DC voltage into an AC voltage;

a starting pulse generating circuit for generating a high voltage required for the start-up of the high pressure discharge lamp;

a lighting state decision unit for deciding a lighted/unlighted state of the high pressure discharge lamp by detecting a lamp voltage and then comparing a detected value of the lamp voltage with a predetermined decision threshold; and an operating state switching control unit for switching the operating state of at least one of the DC/DC converter, the DC/AC inverter, and the starting pulse generating circuit to another operating state, depending on a predetermined operation phase out of the start-up, stable lighting and power interrupt phases of the high pressure discharge lamp, and controlling the operating state, wherein the decision threshold changes for each operation phase.

2. The device of claim 1, wherein, in the start-up operation phase of the discharge lamp among the predetermined operation phases, where the discharge lamp undergoes a dielectric breakdown by the starting pulse and a transition from a glow discharge to an arc discharge takes place, the decision threshold voltage is set lower than a decision threshold voltage in the stable lighting operation phase after the arc discharge is carried out.

3. The device of claim 2, wherein, in the operation phase during the discharge lamp start-up, the decision threshold voltage is set sufficiently lower than a glow discharge voltage of the discharge lamp.

4. The device of claim 1, further comprising a power source voltage decision circuit for deciding a voltage state of the DC power source, wherein, in the power interrupt operation phase among the predetermined operation phases, where the power source voltage of the DC power source is below a predetermined value, the decision threshold voltage is set lower than a decision threshold voltage in the stable lighting operation phase.

5. The device of claim 4, wherein, in the power interrupt operation phase, the decision threshold voltage is set to become relatively low, depending on a decrease in the power source voltage of the DC power source.

6. A luminaire having the high pressure discharge lamp lighting device of claim 1.

7. A discharge lamp lighting device, comprising:
a DC/DC converter for converting a power source voltage of a DC power source into a DC voltage to;
a DC/AC inverter for inverting the DC voltage into an AC voltage which is applied to a discharge lamp;
a starting pulse generating circuit for generating a start-up high voltage required for starting the discharge lamp; and
a lighting state decision unit for determining a lighted/unlighted state of the discharge lamp by detecting a lamp voltage and then comparing a detected value of the lamp voltage with decision thresholds of operation phases which include a start-up, a stable lighting and a power interrupt operation phase,
wherein at least two of the decision thresholds of the start-up, the stable lighting and the power interrupt operation phase are different from each other.

8. The device of claim 7, wherein, in the start-up operation phase, the discharge lamp undergoes a dielectric breakdown by a starting pulse and a transition from a glow discharge to an arc discharge takes place, and the decision threshold of the start-up operation phase is lower than that of the stable lighting operation phase, which occurs after the arc discharge.

9. The device of claim 8, wherein the decision threshold of the start-up operation phase is lower than a glow discharge voltage of the discharge lamp.

10. The device of claim 7, further comprising a power source voltage decision circuit for determining a level of the power source voltage,
wherein, in the power interrupt operation phase, the power source voltage is set below a threshold voltage and the decision threshold of the power interrupt operation phase is lower than that of the stable lighting operation phase.

11. The device of claim 10, wherein the decision threshold of the power interrupt operation phase is set to become lower with a decrease in the power source voltage of the DC power source.

12. The device of claim 7, wherein the decision thresholds of the start-up, the stable lighting, and the power interrupt operation phase are different from each other.

13. A luminaire having the discharge lamp lighting device of claim 7.

* * * * *